United States Patent [19]
LaGrone

[11] Patent Number: 5,533,680
[45] Date of Patent: Jul. 9, 1996

[54] PROCESS TO GRIND THERMOSET OR THERMOPLASTIC MATERIALS

[75] Inventor: Bobby D. LaGrone, Vicksburg, Miss.

[73] Assignee: U.S. Rubber Reclaiming, Inc., Vicksburg, Miss.

[21] Appl. No.: 364,955

[22] Filed: Dec. 28, 1994

[51] Int. Cl.[6] .................................................. B02C 19/00
[52] U.S. Cl. .................. 241/23; 62/384; 62/603; 241/65; 241/DIG. 37
[58] Field of Search ................ 241/65, 23, DIG. 37; 264/28, 37; 62/8, 10, 35, 384, 388; 425/445

[56] References Cited

U.S. PATENT DOCUMENTS

| | | |
|---|---|---|
| 3,633,830 | 1/1972 | Oberpriller . |
| 3,921,917 | 11/1975 | Meinass . |
| 4,025,990 | 5/1977 | Lovette, Jr. . |
| 4,102,503 | 7/1978 | Meinass . |
| 4,491,484 | 1/1985 | Williams ............... 241/DIG. 37 X |
| 4,607,796 | 8/1986 | Enikolopov et al. . |
| 4,692,982 | 9/1987 | Rice ........................ 241/DIG. 37 X |
| 4,863,106 | 9/1989 | Perkel . |
| 4,979,685 | 12/1990 | Shioda et al. ............ 241/DIG. 37 X |
| 5,203,511 | 4/1993 | Ondush et al. . |

FOREIGN PATENT DOCUMENTS

| | | | |
|---|---|---|---|
| 29662 | 3/1977 | Japan ............................ 241/DIG. 37 |

OTHER PUBLICATIONS

Bantum™ Mikro–Pulverizer Bulletin 51F3, MikroPul, Division of the Slick Corp., Summit, N.J. (1970).

"Development and Application of Superfine Tire Powders for Rubber Compounding", *Rubber World*, Jun. 1992, pp. 25–29, 40.

Nuclear Engineering International, $CO_2$ *Blasting in Europe*, pp. 15–17, Mar. 1995.

*Primary Examiner*—Mark Rosenbaum
*Attorney, Agent, or Firm*—Barnes & Thornburg

[57] ABSTRACT

Dry ice snow is used to embrittle thermoset or thermoplastic materials for further treatment. The dry ice snow is formed from carbon dioxide gas directly obtained from naturally occurring carbon dioxide gas wells.

21 Claims, 1 Drawing Sheet

PROCESS TO GRIND THERMOSET OR THERMOPLASTIC MATERIALS

BACKGROUND AND SUMMARY OF THE INVENTION

This invention relates to a material embrittlement system, more particularly to a material embrittlement system for treatment of thermoset and thermoplastic materials by contacting the materials with "dry ice" transformed from a naturally occurring $CO_2$ gas well.

A wide variety of industrial operations grind or chop materials for further processing. It is extremely difficult today, however, economically to reduce the size of many substances, including scrap materials, to the fineness necessary for further processing. Although, once reduced, many scrap materials, such as rubber, plastics, roofing, and other thermoset and thermoplastic materials, can be beneficially used in industrial applications either directly or indirectly by blending with virgin materials. Scrap rubber from tires, for example, are a high quality rubber source, but are very tough and require considerable energy to grind into a useful product. In addition, scrap materials are often difficult to handle during size reduction due to their tendency to become tacky and agglomerate when processed using normal milling, chopping or grinding techniques.

A variety of conventional methods are available for reducing the size of materials. For example, ambient grinding processes are commonly used, but are only capable of reducing the particle size of the material to approximately 50 mesh (U.S. Standard). This limitation is attributed to heat buildup in grinding which causes agglomeration of thermoset and thermoplastic particles. Alternatively, wet grinding processes are available which grind particles finer than conventional ambient processes. Wet grinding processes, however, generally require extra energy input to separate and to dry the particles. In addition, wet processes create air and water pollution concerns.

Moreover, cryogenic processes have been developed which achieve increased particle size reduction while using conventional ambient grinding techniques. Liquid nitrogen is often used in the cryogenic process to embrittle the material prior to grinding. This precooling eliminates heat buildup, and thus lessens the chance of particle agglomeration in the grinder. In this manner, size reduction down to 100 mesh and finer can be achieved. However, most cryogenic processes using liquid nitrogen are very expensive due to gas loss, high consumption of electrical energy, and extra equipment required to produce the liquid nitrogen. Cryogenic processes can also use "dry ice" (i.e., solid $CO_2$) or compressed $CO_2$ to embrittle the feed material prior to grinding. However, like liquid nitrogen, a great amount of energy is required to compress the $CO_2$ gas into "dry ice". These additional costs tend to limit the use of cryogenic grinding to high value materials.

The present invention is directed accordingly to a system for the treatment of thermoset and thermoplastic materials to form an embrittled product at a heretofore unattainable low cost with minimal pollution control problems. The system comprises a naturally occurring $CO_2$ gas well, a pressure-reduction conduit coupled to the $CO_2$ gas well, pressure control valves for regulating the flow of the $CO_2$ gas through the pressure-reduction conduit, a cryogenic chamber for transforming the $CO_2$ gas flowing through the pressure-reduction conduit to dry ice snow, and a feed line for inserting the materials into the chamber for contact with the "dry ice" snow. The system is ideally suited to embrittle scrap materials for processing in a variety of conventional grinders for incorporation into new high quality products. However, the system can be used to embrittle various virgin materials as well. Additionally, the low manufacturing cost associated with the system when compared with conventional wet processing and other cryogenic processes will lead to greater customer acceptance of recycled materials. A greater consumption of recycled materials will be of special benefit to the environment.

The present invention is further directed to a process for treating thermoset and thermoplastic materials to form a substantially embrittled product. The process comprises extracting high pressure $CO_2$ gas from naturally occurring $CO_2$ well. The high pressure $CO_2$ gas is fed into a pressure-reduction conduit. At least one pressure-control valve, positioned within the pressure-reduction conduit, is manipulated to allow predetermined portions of $CO_2$ gas to flow through the pressure-reduction conduit at increasingly stepped-down pressures. Once the pressure of the $CO_2$ gas has reached a controlled pressure conducive to forming "dry ice", the $CO_2$ gas is released into a non-pressurized cryogenic cooling chamber. The $CO_2$ gas is converted into a very cold "dry ice" snow as it enters the cryogenic cooling chamber. The material is contacted with the "dry ice" snow to form an embrittled product suitable for either grinding or for other process where embrittlement is desired.

Other objects and features of the present invention will become apparent as this description progresses.

DETAILED DESCRIPTION OF THE DRAWINGS

Figure 1:
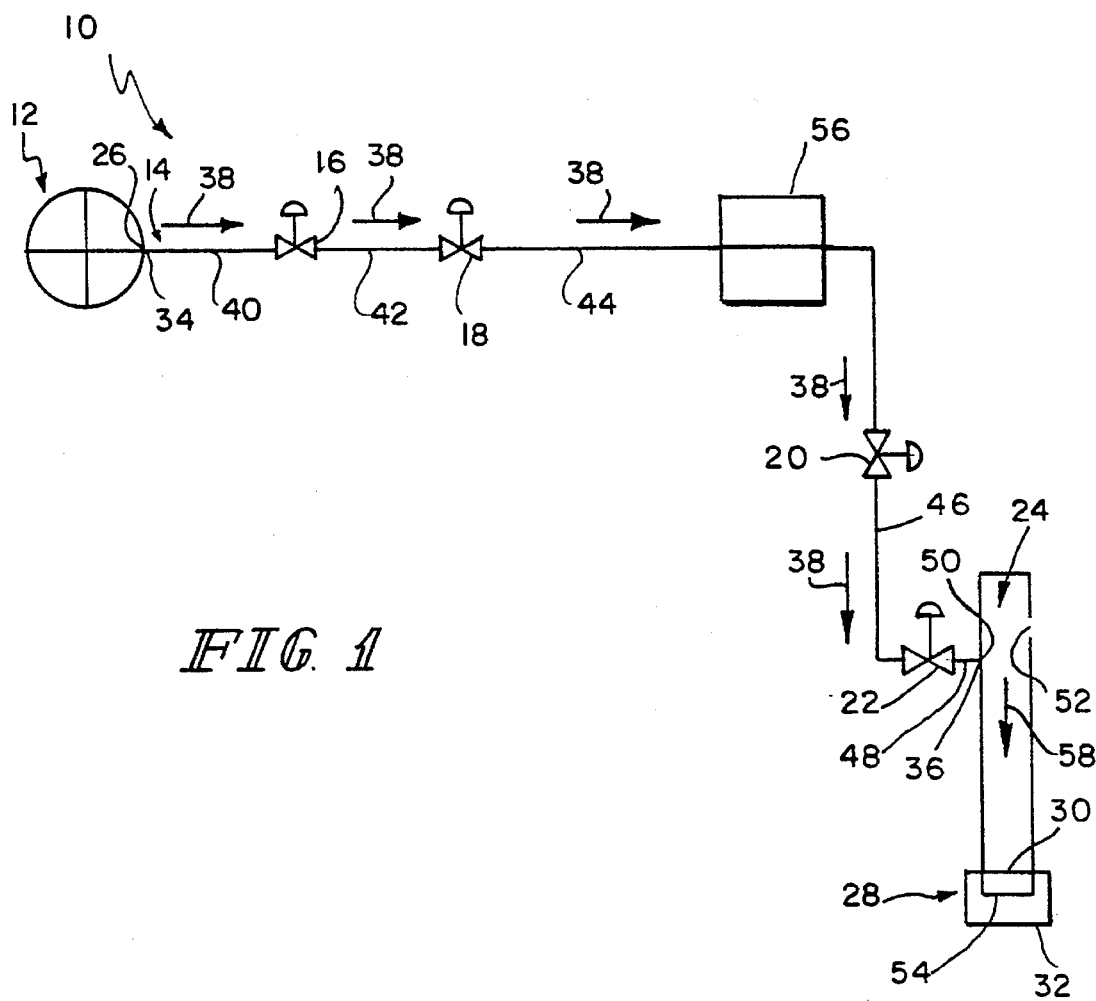
FIG. 1 is a diagrammatic view of a system in accordance with the present invention showing the flow of $CO_2$ gas through a pressure-reduction conduit and into a cryogenic chamber to contact materials and form an embrittled product.

An embrittlement system 10 and process in accordance with the present invention treats thermoset and/or thermoplastic materials to form a substantially embrittled product. The system 10 is shown in FIG. 1. The system 10 comprises a naturally occurring $CO_2$ gas well 12, a pressure-reduction conduit 14, pressure-control valves 16, 18, 20, 22 positioned within the pressure-reduction conduit 14, and a cryogenic chamber 24. The pressure-reduction conduit 14 extends between the $CO_2$ gas well 12 and the cryogenic chamber 24 to provide a flow path for the high pressure $CO_2$ gas.

Naturally occurring $CO_2$ gas wells 12 containing a high pressure $CO_2$ gas are found throughout the world. For example fields of $CO_2$ wells 12 can be found within the United States of America in the states of Mississippi, West Virginia, New Mexico, Oregon, and Montana. In fact, many $CO_2$ wells 12 were discovered while drilling for oil or natural gas and are currently unused due to a limited commercial market for the $CO_2$ gas. Great quantities of $CO_2$ gas can be produced from these wells 12 very efficiently and at low cost using well known natural gas production techniques.

The $CO_2$ gas present in the bottom of these wells 12 has a pressure of approximately 10,000 pounds per square inch (psi) and is at an extremely high temperature. The $CO_2$ gas well 12 in accordance with the present invention is provided with a standard gas recovery system (not shown) having a well head 26. When the $CO_2$ gas has risen through the recovery system (not shown) to the surface of the earth, at the well head 26, the pressure of the $CO_2$ gas drops to approximately 4500 psi at about 80° F.

It is this high pressure $CO_2$ gas at the well head 26, which is stepped-down within the pressure-reduction conduit 14 and converted into "dry ice" snow to embrittle a variety of thermoset and thermoplastic materials. To increase the economic benefit of a low cost source of cryogen, the cryogenic cooling chamber 24 and a grinding apparatus 28 are located within close proximity to the well head 26 of the producing $CO_2$ gas well 12. Illustratively, the grinding apparatus 28 comprises a material inlet 30 for insertion of the embrittled product therein and a material discharge outlet 32. Illustratively, the grinding apparatus 28 may be a Bantam™ Mikro-Pulverizer, W., or gravity type (Hosokawa, Micron Powder Systems, Summit, N.J.). It is however contemplated, that the grinding apparatus 28 may be one of a wide variety of milling, chopping, or grinding devices.

The pressure-reduction conduit 14 is coupled to the well head 26, allowing the high pressure $CO_2$ gas to expand therein and undergo a significant reduction in pressure. Pressure-reduction conduit 14 comprises an inlet 34 coupled to the well head 26, an outlet 36 coupled to the cryogenic chamber 24, and a passageway extending between the inlet 34 and the outlet 36. It is contemplated that a high pressure pipelines or storage container systems (not shown) may be positioned between the well head 26 and the pressure-reduction conduit 14.

The passageway of the pressure-reduction conduit 14 is configured for flow of the $CO_2$ gas therein so that the $CO_2$ gas is moved between the inlet 34 and outlet 36 as indicated by arrows 38. Illustratively, the passageway extends through a pressure-reduction conduit 14 formed to have a diameter of about four inches. It is contemplated, however, that a variety of conduits formed to withstand high pressure $CO_2$ gas and having a variety of dimensions may be used in accordance with the present invention.

Illustratively, the system 10 includes a series of four pressure-control valves 16, 18, 20, 22 positioned in spaced-apart relation between the inlet 34 and the outlet 36. See FIG. 1. Each of the valves 16, 18, 20, 22 is situated in order to establish an orifice (not shown)therethrough. The orifice is sized to have a diameter relatively less than the diameter of the passageway so that the flow of $CO_2$ gas through the passageway of the pressure-reduction conduit 14 is regulated. A first section 40 of the pressure-reduction conduit 14 extends between the inlet 34 and the first valve 16. A second section 42 extends between the first valve 16 and the second valve 18. A third section 44 extends between the second valve 18 and the third valve 20. A fourth section 46 extends between the third valve 20 and the fourth valve 22. Additionally, a fifth section 48 extends between the fourth valve 22 and the outlet 36. The valves 16, 18, 20, 22 may be any of a variety of commercially available process control valves, such as Fishers high pressure control valves.

The cryogenic chamber 24 is positioned at the outlet 36 of the pressure-reduction conduit 14. The cryogenic chamber 24 is at approximately 0 psi and is configured to convert the low pressure $CO_2$ gas to "dry ice" snow. The cryogenic chamber 24 may be selected from a wide variety of commercially available cooling chambers. Illustratively, the cooling chamber 24 is formed to include a gas feed 50, a product feed 52, and a product exit 54. The outlet 36 of the pressure-reduction conduit 14 is coupled to the gas feed 50 of the cryogenic chamber 24 and the materials to be embrittled are fed into the chamber 24 through the product feed 52. Illustratively, the material inlet 30 of the grinding apparatus 28 is positioned at the product exit 54 of the chamber 24 so that the embrittled product may subsequently be reduced into fine particles in the grinding apparatus 28. It is contemplated that the refrigeration effect and feature of the system 10 can also be applied to a variety of non-grinding process where a low cost source of refrigeration or cooling is useful.

It is further contemplated that the system 10 in accordance with the present invention includes a controller (not shown) for automatically manipulating the diameter of the orifice of the pressure-control valves 16, 18, 20, 22. The controller may be any of a variety of commercially available process control instruments. Controller, through selectively increasing and decreasing the diameter of the orifice (not shown)of valves 16, 18, 20, 22, serves as a means for regulating the flow of $CO_2$ gas between the inlet 34 and the outlet 36.

It is also contemplated that a scrubber 56 is positioned on the pressure-reduction conduit 14. Illustratively, the scrubber 56 is positioned on the third section 44 of the pressure-reduction conduit 14 between pressure-control valves 18 and 20. The $CO_2$ gas from the naturally occurring wells 12 is generally substantially pure (98.66%) at the inlet 34. The $CO_2$ gas, however, may be contaminated with substances such as hydrogen sulfide, methane, and nitrogen gas. The scrubber 56 removes a significant portion if not all of the impurities from the $CO_2$ gas. A wide variety of commercially available scrubbers 56 can be utilized in accordance with the present invention.

In practice of the method of the present invention, $CO_2$ gas at approximately 4500 psi is fed into the pressure-reduction conduit 14 through the inlet 34 and into the first section 40. The first valve 16 is placed in a substantially reduced diameter position (not shown) so that the $CO_2$ gas does not freely flow through the pressure-reduction conduit 14 at the high pressure and into the cryogenic cooling chamber 24. The series of pressure-control valves 16, 18, 20, 22 are manipulated so that pre-determined portions of the $CO_2$ gas flow through the pressure-reduction conduit 14 as shown by arrows 38, at increasingly reduced pressures. Illustratively, the first valve 16 is manipulated so that a portion of the 4500 psi $CO_2$ gas in the first section 40 flows past the first valve 16 and expands in the second section 42 between the first pressure-control valve 16 and the second pressure-control valve 18. Illustratively, the pressure of the $CO_2$ gas in the second section 42 is reduced to approximately 3000 psi.

In like manner, the second valve 18 is situated in a second reduced diameter position (not shown) so that a portion of the 3000 psi $CO_2$ gas in the second section 42 flows past the second valve 18 and expands in the third section 44 between the second 18 and third 20 valves. Illustratively, the pressure of the $CO_2$ gas in the third section 44 is reduced to approximately 1500 psi. Additionally, the third valve 20 is situated in a third reduced diameter position (not shown) so that a portion of the 1500 psi $CO_2$ gas in the third section 44 flows past the third valve 20 and expands in the fourth section 46 between the third 20 and fourth 22 valves. Illustratively, the pressure of the $CO_2$ gas in the fourth section 46 is about 750 psi.

The fourth valve 22 is also situated in a fourth reduced diameter position (not shown) so that a portion of the 750 psi $CO_2$ gas in the fourth section 46 flows past the fourth valve 22 and expands in the fifth section 48 between the fourth valve 22 and the outlet 36. Illustratively, the pressure of the $CO_2$ gas in the fifth section 48 is about 300 psi. This low pressure $CO_2$ gas is released from the outlet 36 of the pressure-reduction conduit 14 and into the cryogenic cooling chamber 24. Illustratively, the cryogenic cooling chamber 24 is non-pressurized so that the reduced pressure $CO_2$ gas is transformed to a very cold (approximately −109° F.) "dry ice" snow.

It is contemplated that the orifice of the valves 16, 18, 20, 22 may be manipulated to have a wide variety of diameters so long as the pressure of the $CO_2$ gas is substantially reduced from a high pressure at the inlet 34 to a low pressure conducive to forming "dry ice" at the outlet 36. In addition, the pressures of the $CO_2$ gas in the sections 40, 42, 44, 46 may vary so long as the pressure is controlled at about 300 psi at the outlet 36. As the $CO_2$ gas flows from the outlet 36, the materials to be embrittled are inserted into the cryogenic chamber 24 through the product feed 52 for contact with the resulting $CO_2$ "dry ice" snow. Illustratively, the $CO_2$ gas and the materials are fed into the chamber 24 simultaneously so that the $CO_2$ snow and the materials fall together, as shown by arrow 58, toward the product exit 54. See FIG. 1. Substances suitable for embrittlement in accordance with the present invention include thermoset and or thermoplastic materials such as rubber, plastics, roofing, and other materials prone to agglomerate when subjected to conventional ambient grinding techniques.

The method in accordance with the present invention further contemplates the step of automatically increasing and reducing the diameters of the orifice (not shown) of valves 16, 18, 20, 22. The controller (not shown) automatically adjusts the position of the controlled valves 16, 18, 20, 22 to allow flow, as shown by arrows 38, of $CO_2$ gas from the well head 26 toward the cryogenic chamber 24 at increasingly reduced pressures. After expanding and being converted to a controlled pressure, the $CO_2$ gas is released from the pressure-reduction conduit 14. As the $CO_2$ gas is being released into the cryogenic cooling chamber 24, it is converted to the "dry ice" snow.

The method may additionally include the step of feeding the embrittled material and $CO_2$ snow into the material inlet 30 of the grinding apparatus 28 so that the embrittled material is ground into reduced sized particles. Additionally, the method may include the steps of venting the "warm" substantially non-toxic spent $CO_2$ gas from the grinding apparatus 28 and collecting it in a containment device (not shown). This collected $CO_2$ gas may later be used further processing such as injection into oil wells to enhance flow.

It is further contemplated that a method in accordance with the present invention may include the step of bleeding a portion of the extremely high pressure of the $CO_2$ gas from the pressure-reduction conduit 14. This high pressure $CO_2$ gas can be used to provide mechanical energy for operating turbines or other equipment (not shown).

Although the invention has been described in detail with reference to certain preferred embodiments, variations and modifications exist within the scope and spirit of the invention as described and defined in the following claims.

What is claimed is:

1. A system for the treatment of thermoset and thermoplastic materials to form a substantially embrittled product, the system comprising a naturally occurring $CO_2$ gas well having a well head, a pressure-reduction conduit comprising an inlet coupled to the well head, an outlet, and a passageway communicating with the inlet and the outlet, means for regulating flow of the $CO_2$ gas through the passageway from the inlet to the outlet so that the $CO_2$ gas is converted from a high pressure to a substantially lower pressure, means for transforming the lower pressure $CO_2$ gas to dry ice snow, said transforming means being coupled to the outlet of the pressure-reduction conduit, and means for contacting the materials with the dry ice snow so that the materials are cooled to a reduced temperature and form a substantially embrittled product.

2. The system of claim 1, wherein the regulating means includes a pressure control valve positioned at the inlet of the pressure-reduction conduit.

3. The system of claim 2, wherein the regulating means includes a series of pressure control valves positioned in spaced apart relation throughout the passageway and control means for selectively reducing the diameters of the valves in the series so that the $CO_2$ gas expands in the passageway and is converted to the substantially lower pressure.

4. The system of claim 3, wherein the series includes 4 automated pressure control valves.

5. The system of claim 2, wherein the regulating means includes a second pressure-control valve in the passageway and control means for placing the second valve in a second reduced diameter position so that a portion of $CO_2$ gas positioned in the pressure-reduction conduit expands in the passageway between the second control valve and the outlet.

6. The system of claim 5, wherein the regulating means includes a third pressure-control valve positioned in the passageway between the second pressure-control valve and the outlet.

7. The system of claim 6, wherein the regulating means includes a fourth pressure-control valve positioned in the passageway between the third pressure-control valve and the outlet.

8. The system of claim 1, wherein the transforming means is a cryogenic cooling chamber coupled to the outlet of the pressure-reduction conduit.

9. The system of claim 8, wherein the cooling chamber is substantially free of pressure.

10. The system of claim 8, wherein the contacting means includes a product feed line extending into the cooling chamber.

11. The system of claim 10, further comprising means for grinding the embrittled product so that the materials are reduced to a fine grind product.

12. The system of claim 11, wherein the grinding means is an impact pulverizer apparatus.

13. The system of claim 11, wherein the grinding chamber includes means for venting $CO_2$ gas therefrom.

14. The system of claim 13, further comprising means for collecting the vented $CO_2$ gas.

15. A process for treating thermoset and thermoplastic materials to form a substantially embrittled product, said process comprising the steps of obtaining high pressure $CO_2$ gas from a naturally occurring $CO_2$ well, feeding the high pressure $CO_2$ gas into a pressure-reduction conduit provided by an inlet coupled to the well, an outlet, a passageway communicating with the inlet and outlet, and a series of pressure control valves positioned in spaced-apart relation throughout the passageway, manipulating the series of pressure-control valves so that pre-determined portions of $CO_2$ gas flow through the passageway at increasingly reduced pressures until the $CO_2$ gas is at a controlled pressure conducive to forming dry ice when released, releasing the controlled pressure $CO_2$ gas into a cryogenic cooling chamber to form a dry ice snow, and contacting the materials with the dry ice snow to form an embrittled product.

16. The process of claim 15, further comprising the step of inserting the embrittled material into a grinding apparatus.

17. The process of claim 15, wherein the releasing step further includes the step of recovering $CO_2$ gas present within the grinding apparatus.

18. The process of claim 15, in which the controlled pressure is approximately 300 pounds per square inch.

19. A system for the treatment of thermoset and thermoplastic materials to form a substantially embrittled product, the system comprising a naturally occurring $CO_2$ gas well having a well head, means for extracting the $CO_2$ gas through the well head so that the $CO_2$ gas is present at a high pressure, a pressure-reduction conduit formed to include an inlet coupled to the extracting means, an outlet, and a passageway for the flow of the high pressure $CO_2$ gas communicating between the inlet and the outlet, means for regulating flow of the $CO_2$ gas in the passageway so that pre-determined portions of the $CO_2$ gas flow through the pressure-reduction conduit at predetermined intervals to convert the high pressure $CO_2$ gas to a substantially lower controlled pressure, a chamber positioned at the outlet of the passageway, the chamber including means for transforming the controlled pressure $CO_2$ gas to dry ice snow, and means for contacting the materials with the dry ice snow so that the materials are cooled to a reduced temperature and form a substantially embrittled product.

20. The system of claim 19, wherein the regulating means include a series of pressure control valves each being formed to include an orifice therethrough, said valves positioned in spaced-apart relation throughout the passageway.

21. The system of claim 20, wherein the series of pressure control valves includes control means for selectively increasing and decreasing the diameters of the orifices of the valves in the series so that the $CO_2$ gas expands in the passageway.

\* \* \* \* \*